P. W. LITCHFIELD.
VEHICLE WHEEL RIM.
APPLICATION FILED AUG. 10, 1908.
943,029.
Patented Dec. 14, 1909.
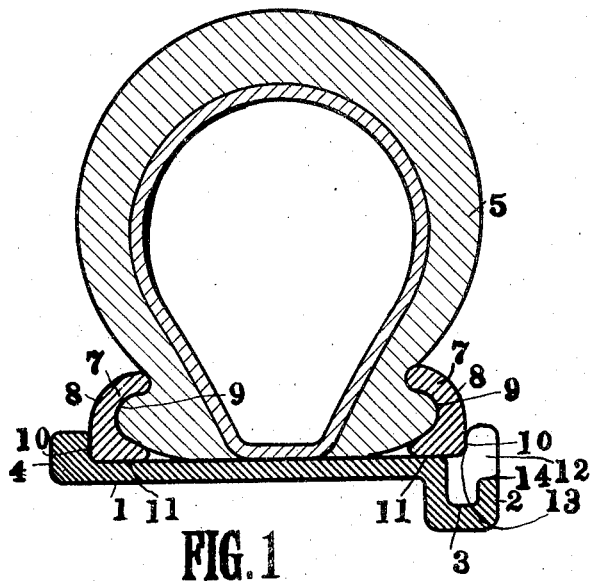
FIG. 1
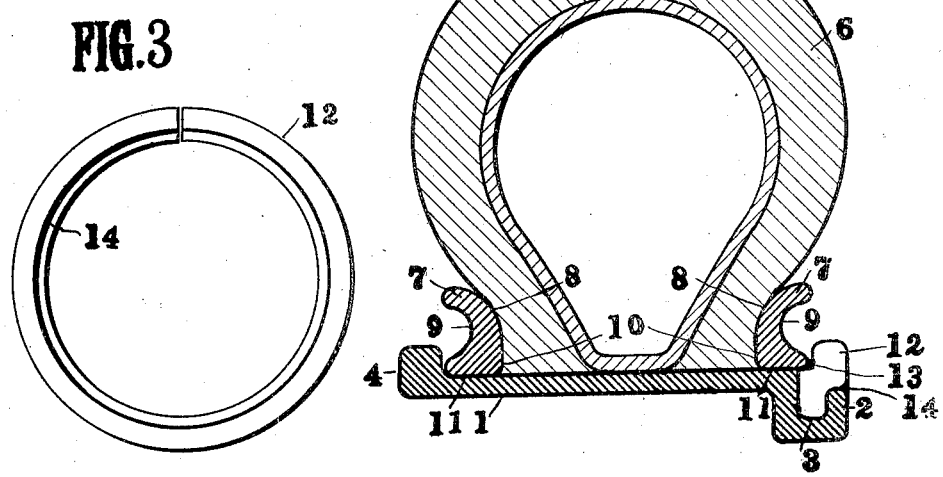
FIG. 3
FIG. 2
WITNESSES
Evelyn Blinn
Glenara Fox
INVENTOR
Paul W. Litchfield
by C. E. Humphrey
ATTORNEY.

UNITED STATES PATENT OFFICE.

PAUL W. LITCHFIELD, OF AKRON, OHIO, ASSIGNOR TO THE GOODYEAR TIRE AND RUBBER COMPANY, OF AKRON, OHIO, A CORPORATION OF OHIO.

VEHICLE-WHEEL RIM.

943,029.

Specification of Letters Patent. Patented Dec. 14, 1909.

Application filed August 10, 1908. Serial No. 447,770.

*To all whom it may concern:*

Be it known that I, PAUL W. LITCHFIELD, a citizen of the United States, residing at Akron, in the county of Summit and State of Ohio, have invented new and useful Improvements in Vehicle-Wheel Rims, of which the following is a specification.

This invention relates to vehicle wheel rims provided with pneumatic, solid or cushion tires of elastic material, more particularly pneumatic tires of the double-tube type having contractible, inextensible or semi-inextensible beads or edges and the object thereof is to so construct the rim as to enable the tire to be quickly applied or removed when necessary.

The invention further aims to provide a rim of the class referred to having annular retaining means for the tire hereinafter more specifically described, said means fixedly securing the tire in position so that the same will not be accidentally displaced in any manner, said retaining means being movable as well as reversible to enable its use in connection with tires of various constructions.

The primary object of this invention is to provide a new and improved locking means for securely maintaining said retaining means in operative engagement with the tire, said locking means being removable and of such construction that it will effectually coöperate with said retaining means in whichever position the same is placed on the wheel rim and also to construct both the retaining means and locking device that they will interlock in such a manner that the locking device is fixedly secured in position on the rim by the retaining means.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings wherein like reference numerals indicate like parts in the different figures: Figure 1 is a cross sectional view of a vehicle wheel rim constructed in accordance with this invention, also showing in section the retaining means and locking device for securing the tire, said retaining means arranged in operative relation with respect to that form of tire known as the clencher type. Fig. 2 is a similar view showing the arrangement of the retaining means in operative relation with respect to another form of tire; and, Fig. 3 is a view in side elevation of a split locking device for securing the retaining means in position on the rim.

Referring to the drawings in detail, the reference numeral 1 denotes a flat rim having one side formed with an endless offset 2 somewhat angular in cross section and provided with a circumferentially-extending groove or channel 3 constituting a seat for a purpose to be hereinafter set forth. This offset is on the level or depends below the outer face of the rim. The other side of the rim 1 is preferably formed with an outwardly-extending endless flange 4 forming an abutment for a purpose to be hereinafter set forth. The retaining means for the tire, whether it be used for the form of tire shown in Fig. 1 and indicated by the reference numeral 5 or whether it be used for the form of tire shown in Fig. 2 and indicated by the reference numeral 6 consists of a pair of endless retaining-devices 7 and a split locking device. Each of the retaining devices is removable as well as reversible and these devices are also interchangeable. When the said devices are in the position shown in Fig. 1 they act as clamps for engaging the beaded edges of a clencher type of tire and when they are in the position shown in Fig. 2 they act as tire-holders for a tire having inextensible edges or selvages. Each of the tire-retaining devices is formed with bearing surfaces 8 and 9 preferably curvilinear in contour and furthermore provided with a vertical bearing surface 10 and a flat bearing surface 11. The flat bearing surface 11 is adapted to constitute the base of the tire retaining means and to rest on the outer surface of the rim 1. The functions of the bearing surfaces 8, 9 and 10 will be hereinafter referred to.

The locking device consists of a split ring 12 and may be of various forms but the inner portion should preferably conform to the shape of the groove or channel 3 in which it is adapted to be seated. The locking device 12 is further provided with a rabbeted portion 13 in its inner lateral face adjacent the outer portion of the rim 1 and one face of this rabbeted portion is preferably adapted to be approximately flush with the outer face of said rim. The opposite lateral portion of the locking device is provided with a shoulder 14 adapted to rest on and overhang the outer edge of the offset 2 and the outer face of this overhanging portion is preferably in the same vertical plane as the lateral face of the offset 2.

In mounting a tire such as is shown in Fig. 1 and referred to by the reference numeral 5, on the rim, the bearing surface 10 on one of the retaining devices 7 bears against the flange 4 and the surface 10 of the other retaining device bears against the vertical portion of the rabbet 13 of the locking device 12. The flat inner surface 11 of one of the retaining devices rests upon the outer face of the rim in close proximity on one side of the flange 4 and on the opposite side the base portion of the other retaining device 7 is adapted to extend outwardly beyond the surface of the rim and rest on the horizontal portion of the rabbet 13 of the locking device 12. The curvilinear-bearing surfaces 8 engage the base portion of the tire 5. When the tire is inflated the pressure is against the curvilinear-bearing surfaces 8 of the retaining devices which causes them to securely retain themselves against the flange 4 and upon the locking device 12, at the same time the retaining device which is arranged in operative relation with respect to the locking device is securely locked by said locking device in position and said locking device is also locked in position in its seat in the channel 3 by reason of the overlapping of the base portion of the tire-retaining device onto the horizontal portion of the rabbeted portion thereof. The retaining devices are set up in operative relation with respect to the tire before the locking device is sprung into the channel in the offset 2. After the retaining devices are in position the locking device is securely held in its seat in the channel thereby.

Although the locking device is intended to keep the retaining device from slipping off the rim (that retaining device which is engaged by the locking device), the retaining device itself automatically locks the locking device in its seat both when the tire is being inflated and after complete inflation. By this arrangement the locking device cannot be taken out or become accidentally displaced from its seat in the channel 3 without first deflating the tire and then moving the endless tire-retaining device 7 toward the center of the rim when the locking device can be quickly detached by springing it out of its seat.

In mounting a tire such as is shown in Fig. 2 on the rim the retaining devices are reversed and the bearing surfaces 9 thereof, bear respectively, against the sides of the inextensible edges or selvages of the tire shown therein and the bases of the retaining devices rest upon the rim in the same manner as has been described with reference to Fig. 1. The action of the retaining devices in this arrangement securely holds the tire upon the rim and the action of the locking device is the same as that already referred to. In this construction, however, the opposite sides of the base portion of the retaining device overlap and rest on the horizontal portion of the rabbet 13 of the locking device. The peculiar advantage obtained by this construction consists in the fact that the base portion of one of the retaining devices will always extend beyond the side edge of the rim and overlap and bear against the horizontal portion of the rabbet in the locking device thereby fixedly securing the same against unintentional displacement, as long as outward pressure is brought to bear against the inner bearing surface of the tire-retaining means.

What I claim and desire to secure by Letters Patent, is:—

1. A vehicle wheel rim of the class described having a seat for a tire, an outwardly-extending flange along one side edge thereof and an offset extending inwardly from said tire seat on the opposite side edge, the latter provided with a channel, a split locking ring adapted to be sprung into said channel provided with a rabbeted portion adjacent to said tire seat, the horizontal face of said rabbeted portion being approximately flush with said tire seat, and a pair of endless tire-retaining devices capable of lateral movement on and a reversal of position around said rim, one of said tire-retaining devices adapted to be engaged by said outwardly-extending flange, the other by said locking device and when positioned to lap the horizontal face of the rabbeted portion thereof when in either position, one of the sides of each of said tire-retaining devices fashioned to engage a clencher tire-shoe and the other an inextensible edge tire-shoe, respectively, substantially as and for the purpose described.

2. In combination, a vehicle wheel rim having a seat, a tire retaining means at one side thereof, an off-set at the other side of said seat, said off-set extending inwardly and provided with a channel, a split locking ring adapted to be sprung into said channel and provided with a rabbeted portion adjacent to said seat, a tire-shoe mounted on said seat and a reversible tire retaining means mounted at that side of the seat provided with the off-set and capable of lateral movement in either of its two positions whereby it will engage the rabbeted portion of the ring and retain in connection with said first mentioned tire retaining means, said tire shoe in position.

In testimony whereof I have hereunto set my hand in presence of two subscribing witnesses.

PAUL W. LITCHFIELD.

Witnesses:
H. H. McCloskey,
W. E. Palmer.